(12) United States Patent
Czech et al.

(10) Patent No.: US 10,177,496 B2
(45) Date of Patent: Jan. 8, 2019

(54) PLUG CONNECTION FOR COUPLING HIGH-VOLTAGE TERMINALS AND A SYSTEM WITH SUCH A PLUG CONNECTION

(71) Applicant: AUDI AG, Ingolstadt (DE)

(72) Inventors: Marvin Czech, Ingolstadt (DE); Stefan Schoberer, Mindelstetten (DE); Armin Pöppel, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/661,063

(22) Filed: Jul. 27, 2017

(65) Prior Publication Data
US 2018/0034207 A1    Feb. 1, 2018

(30) Foreign Application Priority Data

Jul. 27, 2016    (DE) .......................... 10 2016 213 757

(51) Int. Cl.
*H01R 3/00* (2006.01)
*H01R 13/631* (2006.01)
*H01R 13/53* (2006.01)

(52) U.S. Cl.
CPC ......... *H01R 13/6315* (2013.01); *H01R 13/53* (2013.01)

(58) Field of Classification Search
CPC ............ H01R 13/5205; H01R 13/5219; H01R 13/5202; H01R 13/5208
USPC ........................................ 439/500, 566, 627
See application file for complete search history.

(56) References Cited

U.S. PATENT DOCUMENTS

| 2012/0040553 | A1  | 2/2012  | Tashiro |
|--------------|-----|---------|---------|
| 2013/0323954 | A1* | 12/2013 | Eckel ................ H01R 13/5219 439/271 |
| 2014/0170886 | A1  | 6/2014  | Kikuchi et al. |

FOREIGN PATENT DOCUMENTS

| DE | 102005016266 A1 | 10/2006 |
| EP | 0849835 A2      | 6/1998  |
| EP | 2413435 A1      | 2/2012  |
| EP | 2808950 A1      | 12/2014 |

OTHER PUBLICATIONS

Examination Report dated Mar. 21, 2017 of corresponding German application No. 102016213757.3; 5 pgs.
German Office Action dated Sep. 25, 2017, in connection with corresponding DE Application No. 10 2016 213 757.3 (8 pgs.).

* cited by examiner

*Primary Examiner* — Phuong Chi T Nguyen
(74) *Attorney, Agent, or Firm* — Maier & Maier, PLLC

(57) ABSTRACT

A plug connection for coupling a first and a second electrical connection of a first high-voltage component to a first and a second electric connection of a second high-voltage component, wherein the plug connection is provided with a housing in which is arranged as a first pair of high-volt terminals for coupling to the first and the second electric connection of the high-voltage component as well as a second pair of high-voltage terminals for coupling to the first and to the second electric connection of the second high-voltage component, wherein at least the first and the second high-voltage terminal are mounted so that they are movable relative to the second pair of connections of the plug connection in the housing.

11 Claims, 2 Drawing Sheets

Figure 1:
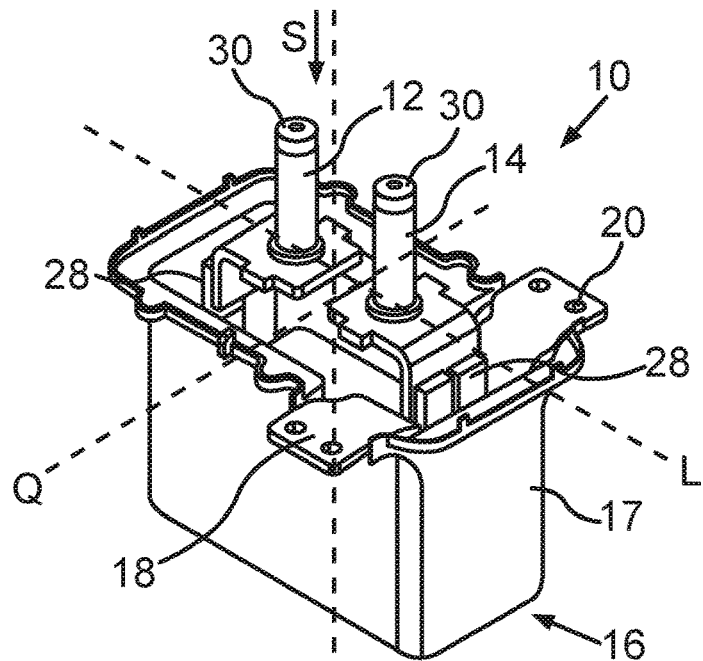

PLUG CONNECTION FOR COUPLING HIGH-VOLTAGE TERMINALS AND A SYSTEM WITH SUCH A PLUG CONNECTION

The invention relates to a plug connection for coupling a first and a second electric terminal of a first high-voltage component to a first and a second electric terminal of a second high-voltage components and a system comprising the first and the second high-voltage component and a plug connection according to the invention. The plug connection is provided with a housing in which a first pair of high-voltage terminals are arranged for coupling to the first and to the second electric terminals of the high-voltage component, as well as a second pair of high-voltage terminals for coupling to the first and the second electric terminal of the second high-voltage component.

Similar plug connections are used in particular for installation in high-voltage batteries. The high-voltage batteries can be further divided for example into a high-voltage storage component, which can contain for example battery cells or battery modules, and an electronic component, which can contain for example an electronic component, for instance fuses, capacitors, battery management systems (BMC), cell management systems (CMS) buffer batteries (MMC) or circuit contactors. The majority of the electronic components is accommodated in a separate module, which is referred to as a battery junction box (BJB). The high-voltage storage component can be in particular accommodated in a separate housing. The battery junction box has a high-voltage interface for the high-voltage storage component. This high-voltage interface corresponds to a positive and negative pole of the battery system to which the entire system power, for example a voltage of the high-voltage component, is applied. According to current state of technology, the connection between the high-voltage interface and the high-voltage storage component is carried out via a flat contact or via a high-voltage cable and it is therefore very complex.

The objective of the present is to further develop a plug connection of the type mentioned in the introduction in such a way that improved coupling of the first high-voltage component and of the second high-voltage component is made possible.

This objective is achieved with a plug connection having the features of the patent claim 1, as well as with a system having the features of the patent claim 11. Advantageous embodiments with suitable further developments of the invention are described in the remaining claims.

The present invention is based on the realization that due to component tolerances in the case of plug connections, tilting often occurs, which is why the assembly of the high-voltage components can be very complex. The tilting can be largely prevented with a movable mounting of the high-voltage terminal and the plug connection can be largely improved.

In order to further develop a generic plug connection in a way that makes it possible to create a particularly save coupling of the first high-voltage component to the second high-voltage component, according to the invention, at least the first and the second high voltage connection of the second pair of the connections of the plug connection are mounted movably with respect to each other in the housing. The high-voltage components can be in particular a high-voltage storage component, which can be in particular the first high-voltage component, and a high-voltage electronic component, which can be in particular the second high-voltage component and a battery junction box. The high-voltage storage component can be in particular designed as a traction battery of a motor vehicle, in particular a motor vehicle that is operated at least partially electrically.

By means of the movable mounting of the first and of the second high-voltage terminal, it can be ensured that the component tolerances can be compensated for when they are being mounted during the manufacturing of the high-voltage components. Therefore, since the high-voltage terminal are movable relative to each other, these tolerances can be very easily compensated for because the high-voltage terminal can be moved very easily relative to each other.

Therefore, an improved electric coupling can be obtained in this manner as the tilting of the plug connection can be minimized. The assembly can thus automated and carried out with reliability, which can result in a reduction of the expenses connected with the assembly or disassembly. This can lead to time saving both during the manufacturing process and in case of repairs.

In an advantageous embodiment of the plug connection, the housing can be provided with a first housing component which comprises electrical insulation at least in some regions for the first high-voltage, as well as a second housing component which comprises electrical insulation at least in some regions for the second high-voltage plug connection. Therefore, since the high-voltage terminals are provided with their own housing, this makes it possible to ensure the high-voltage terminals are securely insulated from each other and mounted in a shock-proof manner so that for example a short circuit can be prevented. Furthermore, movable mounting of the high-voltage terminals can be also made possible.

In an advantageous embodiment, the first and the second housing components can be mounted movably relative to each other and to a third housing component of the housing, wherein at least the first pair of the high-voltage terminals is arranged in the third housing. This embodiment makes it possible to ensure that the high-voltage terminals can be protected against environmental influences, for example splashing water or dust, because the high-voltage terminals are arranged inside the third housing component. The third housing component can be in particular constructed in this case as a shell that at least substantially completely comprises the high-voltage components. Moreover, a prepositioning of the first and of the second high-voltage terminals can be carried out with the third housing component.

According to another advantageous embodiment, the first and the second housing components can be further mounted movably relative to the fourth housing component, wherein the fourth housing component is designed to fix the second housing component in a plug-in direction of the plug connection.

The fourth housing component can be fixed in particular above the first and the second housing component on the third housing component, which can be in particular carried out with a screw connection. The fourth housing component serves in particular to limit the freedom of movement of the first and of the second high-voltage terminal. The fourth housing component is used in particular to fix at least partially Moreover, movable mounting of both high-voltage terminals is enabled. In addition, the first and the second high-voltage terminal in the plug-in direction, can thus be used in particular to limit the freedom of movement of the plug connection to protect in an even more advantageous manner against environmental influences as the fourth housing component provide further sealing of the housing.

In another advantageous embodiment, the first and the second high-voltage terminal are arranged in the direction of the plug-in connection and/or in a first transverse direction which is perpendicular to the plug-in direction and/or in a second transverse direction, which is perpendicular to a service which is formed with the plug-in direction in the perpendicular direction so that it is movably mounted. Freedom of movement can be thus be enabled at least in one spatial direction so that an improved electric coupling can be realized. It has been proven particularly advantageous and preferred when the freedom of movement of the high-voltage terminal is enabled in two spatial direction, in particular in the transfer direction and in the longitudinal direction, and when freedom of movement is enabled on one plane, which is formed in particular by the transverse direction and the longitudinal direction (3 degrees of freedom). This mounting is referred to as floating mounting. By means of this embodiment, a movable mounting is possible in two spatial dimensions, so that a particularly advantageous floating mounting can be realized. This makes it possible to ensure that that even with large component tolerances, certain coupling of the first high-voltage element is enabled. Also, mounting freedom is possible in all three spatial directions, and so is translational movement freedom with three movement degrees. With this embodiment, the high-voltage terminals can be realized with six freedom degrees, wherein an even higher component tolerance can be achieved.

In another advantageous embodiment, the first pair of high-voltage terminals can be respectively electrically coupled to the second pair of high-voltage terminals via a flexible conductor. The flexible conductor can be in particular can be in particular a cable braid, which can be in turn connected by means of welding, in particular ultrasound welding, to a high-voltage terminal. This embodiment makes it possible to prevent damage to the conductor with a movement of a high-voltage terminal because it is provided with a flexible design. A rigid embodiment could in particular result in a breakage of the conductor. The lifespan of the plug connection can thus be increased in a very advantageous manner.

According to another embodiment of the invention, the second pair of high-voltage terminals can be designed as a ping which is used for coupling the first and the second connection, which is designed as a socket corresponding to the respective pin. It is also possible that the second pair of high-voltage terminals is designed as a socket for coupling to the first and to the second electric pin, so that the socket is designed with a pin corresponding to the respective socket. For example, the pin can have a diameter of 10 to 20 mm, in particular of 14 mm, to be able to conduct a high voltage of the high-voltage battery. The advantage of a pin-socket contact connection is that with high electric currents, high Lorentz forces can be generated, which can lead to a reduction of a holding force of the plug connection. With a radial contact, in contrast to a flat contact, the Lorentz forces can be compensated for. A very high holding force can be thus realized, combined at the same time with a small installation space.

According to another advantageous embodiment, at least one pin can be provided with an electrically insulating layer at least on one end of the pin. The insulating layer can be in particular designed as an insulating cap and it can arranged in the plug-in direction on the end of the ping. The end of the pin can be in particular a free end, which is closest to the first and to the second electric connection of the second high-voltage element in the plugged-in state. By placing the insulating pin on the pin, the contact protection can be further improved because the conductive end of the pin can no longer be contacted.

It has also been found advantageous when at least one of the second pairs of the high-voltage terminal is provided with an insulating border, which is arranged radially around the at least one high-voltage terminal and protrudes at one end of the insulating border in the plug-in direction from the housing beyond at least one of the second pair of high-voltage terminals. This means that the pin is arranged "recessed" from this border so that a possible contacting is prevented thanks to this arrangement. By means of this embodiment, the contact safety can be achieved in a simple manner and yet with reliability. Since the voltage of the first high-voltage component, in particular of the battery module, is applied to the first pair of high-voltage terminals, simple contact safety can be realized by means of pin design with respect to high-voltage terminals. This makes it possible to obtain a substantially more compact construction of the plug-in connection, so that it can be manufactured more cost-effectively.

In a further advantageous embodiment, at least one insulating border is provided with an integrated guide for positioning the first and/or the second electric connection of the second high-voltage component. With this embodiment, an even more advantageous electric coupling of the first high-voltage component with the second high-voltage component is made possible. In particular with an automated assembly of the plug connection, a preliminary guide can be carried out by means of an integrated guide, in particular a prepositioning of the first pair of the high-volt terminal to the second pair of the high-volt terminals. A reduction of the processing times can be obtained by means of this prepositioning because an improved assembly enables an even better electric coupling.

The invention also relates to a system comprising a first and a second high-voltage component and a plug connection according to the invention.

Advantageous further development of the plug connection are to be seen as preferred embodiment of the system.

Figure 2:
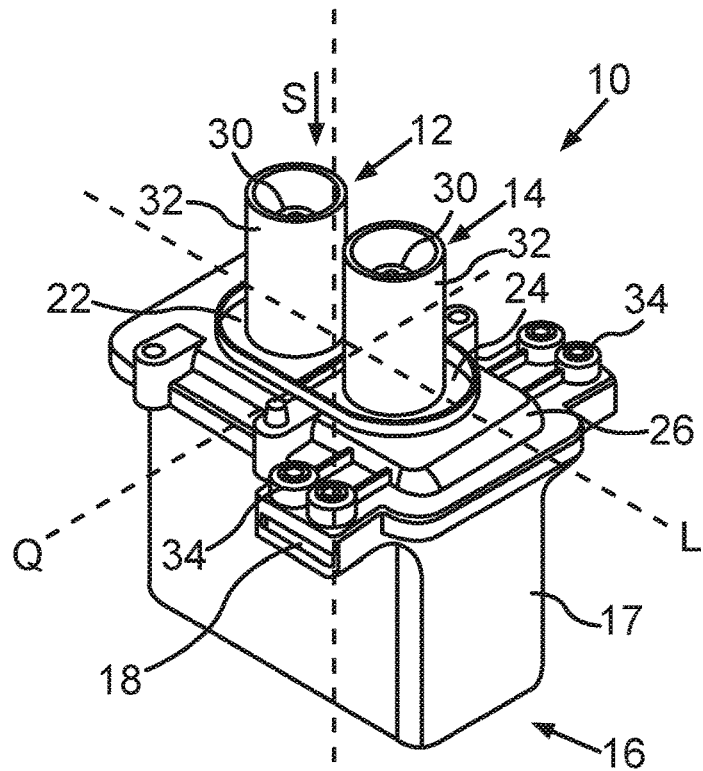
Figure 3:
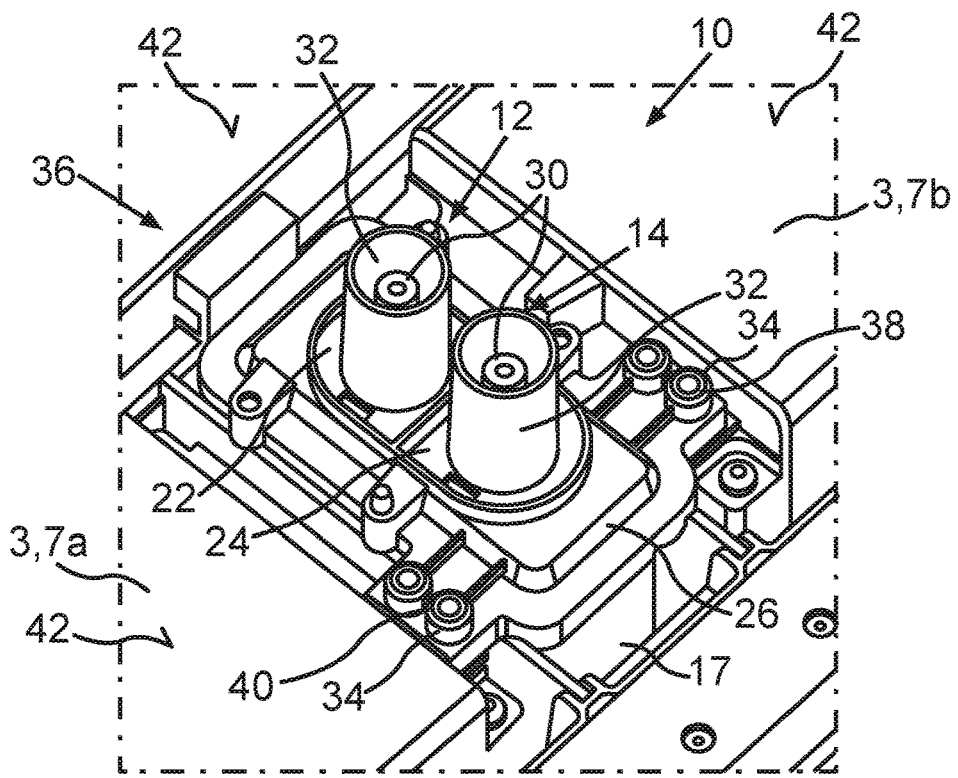
Figure 4:
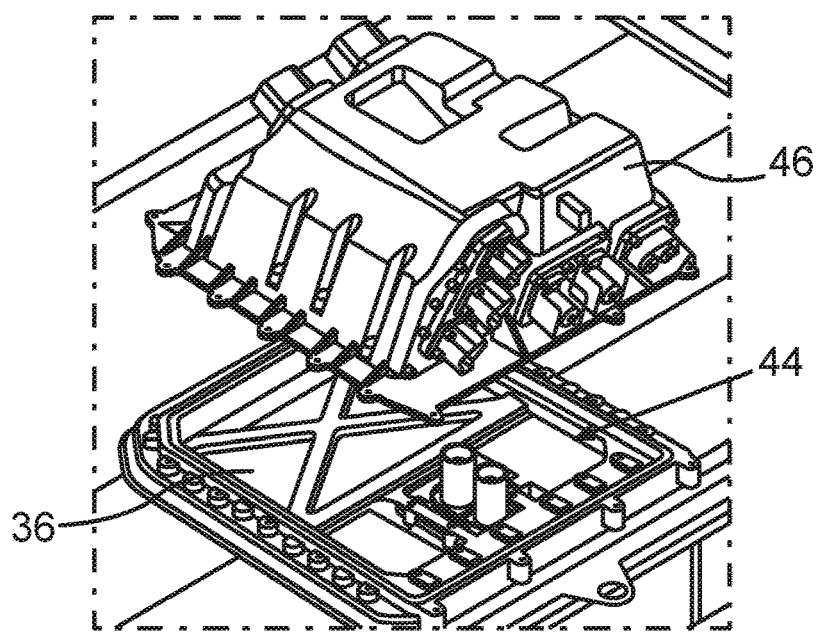

In the following are described embodiments of the invention. The following is shown in this connection:

FIG. 1 a schematic perspective view of an embodiment of the plug connection;

FIG. 2 another schematic perspective view of an embodiment of the plug connection;

FIG. 3 a schematic perspective view of a plug connection according to the invention in an installed state; and FIG. 4 another schematic perspective view of a plug connection according to the embodiment in an installed state.

The embodiment described below is a preferred embodiment of the invention. In this embodiment, the described components of the embodiment represent respectively independent features which should be considered independently of each other, which can be also further developed individually or in combination as independent components of the invention. In addition, the described embodiments can be further complemented with the other, already described features of the invention.

Identical and functionally equivalent components are provided with the same reference numerals.

FIG. 1 shows a schematic perspective view of an embodiment of a plug connection 10 according to the invention. The plug connection 10 is here located in an non-assembled, opened state. The plug connection 10 is provided with a pair of high-voltage terminal 12, 14. The high-voltage terminals which can be in particular designed as pins. The first pair of high-voltage terminals 12, 14 are arranged in a housing 16 indicated to as a whole by the numeral 16. The housing 16 consists in its turn of several housing components 17, 22, 24, 26, wherein in FIG. 1 is illustrated only the third housing component 17. The other housing components 22, 24, 26 are illustrated in FIG. 2. On the third housing component 17 are arranged the first electric terminal 18 and the second electric terminal 20 for connecting for example for example a high-voltage component 36. The first electric terminal 18 can be connected for example to a positive pole of the high-voltage component 36 and the second electric terminal 20 can be connected for example to a negative pole of the first high-voltage component 36. The reversed case is also possible. In addition, the high-voltage terminal 12 can electrically be coupled for example to the first electric terminal 18, while the high-voltage terminal 14 can be electrically coupled for example to the second electric terminal 20. The reversed case is also possible.

The first pair of high-volt terminals 12, 14 can be in particular coupled via a respective flexible line 28 to the first and/or to the second electric terminal 18, 20. Free movement of the high-voltage terminals 12, 14 is made possible thanks to the movable contact via the flexible line 28.

In addition, as one can see from FIG. 1, the high-voltage terminals 12 and the high-voltage terminal 14 are electrically separated from each other and they are mounted so that they are movable relative to each other (floating mounting).

The high-voltage terminals 12, 14 protrude from the housing 16 counter to the plug-in direction S. The plug-in direction S is defined by the direction of the insertion of a second high-voltage component 46 in the plug-in connection 10. The high-voltage terminals 12, 14 are arranged in a first transverse direction Q, side by side and behind a second transverse direction L. IN the first transverse direction Q and in the second transverse direction L are arranged high-voltage terminals 12, 14, which are electrically separated from each other.

The high-voltage terminals are respectively provided with an insulating layer 30, which can be in particular designed as an insulating cap. The insulating layer 30 is in this case located on one first end of the respective pins seen in the plug-in direction and it insulates respective high-voltage terminals 12, 14 in the direction opposite to the plug-in direction. Contact protection can thus be ensured in the plug-direction S.

FIG. 2 shows a schematic perspective view of the embodiment of the plug connection 10 shown in FIG. 1 in an assembled state. The plug connection 10 is provided with the high-voltage terminals 1, 14 which are surrounded by the respective insulating border 32. In addition, a separate housing component 22, 24 is assigned to each of the high-voltage terminals 12, 14. To the first high-voltage terminal 12 can be assigned for example a first housing component 22, while to the second high-voltage terminal 14 can be assigned for example a second housing component 24. The first housing component 22 and the second housing component 24 can be in particular arranged so that they are movable with respect to each other. The border 32 and the respective housing components 22, 24 can be designed in particular as components in one piece. This makes it possible to ensure that the first and the second high-voltage terminals are electrically insulated from each other and at the same time arranged so that they are movable with respect to each other. The border 32 can be in this case arranged radially around the first or the second high-voltage terminal 12, 14. Between the border 32 and the first and/or second high voltage terminal 12 14 can be in particular formed a gap, in which is additionally to the high-voltage terminals 12, 14 designed in the pin form provided a corresponding socket of the second high-voltage component 46, which is inserted in the plug-direction, wherein the pin and the socket can be coupled to each other.

FIG. 2 further shows a fourth housing component 26, which is plugged into the third housing component 17 and in particular at least partially fixes the first housing component 22 and the second housing component 24 in the plug-in direction S. The fourth housing component can be in particular attached to and/or screwed to the third housing component 17. With the arrangement shown in FIG. 2, in particular of the housing components 17, 22, 24, 26, protection can be provided for the plug connection 10, in particular partial protection against environmental influences, for example dust and/or splashed water. In addition, the fourth housing component 26 can be provided with screw points 24 by means of which the plug connection 10 can be electrically connected to the first high voltage component 36. A firm mechanical connection to the first high-voltage component 36 is thus made possible by means of these screw points 34.

The embodiment illustrated in FIG. 2 is a plug connection 10 according to the invention, which makes it possible for the two high-voltage terminals 12, 14 to move in all directions, so that a high coupling safety can be ensured with the component tolerances of the plug connection in order to connect the first high-voltage component 36 and the second high-voltage component 46 so that they can be coupled electrically to each other.

In addition, contact safety can be also ensured with the plug connection 10 shown in FIG. 2. With the insulating border 32 and with the insulating layer 30 it is possible to prevent in particular a person and/or a robot from touching the second high-voltage terminal 12, 14. This can be in particular ensured when the border 32 protrudes further from the housing 16 than the respective high-voltage terminals 12, 14. The first and/or the second voltage terminals 12, 14 are, are arranged so that they are, in a way of speaking, "sunk" in the first and/or second housing component 22, 24 and they can be reached or electrically coupled only with the corresponding connections.

FIG. 3 shows a schematic perspective view of an embodiment of the plug connection 10 of FIG. 1 and/or FIG. 2 according to the invention. The plug connection 10 is in this case in the state in which it is installed on the first high-voltage component 36. The first high-voltage component can be in particular a battery, specifically a traction battery of a motor vehicle. The traction battery or the first high-voltage component 36 can in this case consist of several cell modules 37a, 37b. The cell module 37a can be connected for example via the first electric connection 18 to a first electric connection 40 of the cell module 37a. The connection can be produced for example via the screw points 34. The first electric connection 40 can be for example the positive pole of the first high-voltage component 36. To one of the first electric connections 40 on the opposite side can be again connected a cell module 37b with the second electric connection 20 of the plug connection 10 via the screw points 34 with a first electric connection 38 of the high-voltage component 36. The second electric connection 38 of the first high-voltage component 36 can be in particular the negative pole of the first high-voltage component 36. It is obvious that the position of the positive and negative pole of the first high-voltage component can be interchanged also in their position at the plug connection 10. A corresponding suitably modified arrangement for example of the flexible line 28 is also possible in the plug connection 10.

The plug connection can be in particular installed in such a way that the housing 16 is at least substantially arranged on the first high-voltage component 16 This means that in particular only the first and the second high-voltage terminal 12, 14 with the corresponding respective border 32 and the respective pins project from the first high-voltage component 36. In other words, a surface 42 of first high-voltage components 36 forms a common surface with an upper side of the housing 16, in particular with an upper side 44 of the fourth housing component 26.

FIG. 4 shows a schematic perspective view of the embodiment of the plug connection 10 of FIG. 1 and FIG. 2. The plug connection 10 is installed in the first high-voltage component 10. The first high voltage component is again mechanically coupled to another housing 44 of the traction battery, and the plug connection 10 is also arranged on the housing 44. The second high-voltage component 46 can be provided with a second electric connection, which corresponds to the high-voltage terminals 12, 14. In particular, this particular embodiment can be socket connections which can be in particular designed as pins corresponding to the high-voltage terminals 12, 14. The sockets can be in this case configured in such a way that they can be arranged in the gap between the insulating border 32 and the pins and so that they can ensure an electric coupling. The second high-voltage component 46 is plugged in the plug-in direction S into the first and the second high-voltage terminal 12, 14. This can be carried out in particular with automated processing, for example by a robot or on an assembly line. This embodiment thus can make it possible that the second electric high-voltage component 46 can be inserted can be plugged into the first high-voltage component 36 very precisely and quickly. Therefore, the assembly time or disassembly time can be saved. The second high voltage component 46 can be in particular a battery junction box, which can contain for example fuses, high-voltage contactor or other electronic parts for the traction battery. In particular, the border 32 can be configured so that it is provided with a guide for a secure coupling of the high-voltage components 36, 46 so that the second high-voltage component 46 can be plugged in an even more secure position on top of the first high-voltage component 36.

The invention claimed is:

1. A plug assembly comprising:
   a plug connector for coupling a first and a second electric connection of a first high-voltage component to a first and a second electric connection of a second high-voltage component,
   wherein the plug connector is provided with a housing having a first pair of high-voltage terminals for coupling with the first and the second electric connections of the first high-voltage component and a second pair of high-voltage terminals for coupling with the first and the second electric connections of the second high-voltage component, and
   wherein the second pair of high-voltage terminals are movable relative to the first pair of high-voltage terminals in the housing.

2. The plug assembly according to claim 1, wherein the first pair of high-voltage terminals is electrically coupled to the second pair of high-voltage terminals by a flexible conductor arranged in the housing.

3. The plug assembly according to claim 1, wherein at least one of the second pair of high-voltage terminals is provided with an insulating border arranged radially around, the insulating border protruding further from the housing than the at least one of the second pair of high-voltage terminals in the plug-in direction.

4. The plug assembly according to claim 1, wherein the at least one insulating border is provided with an integrated guide for positioning of the first and/or of the second electric connection of the second high-voltage component.

5. The plug assembly according to claim 1, wherein each of the second pair of high-voltage terminals is designed as a socket for coupling with a corresponding pin of the second high-voltage component.

6. The plug assembly according to claim 1, wherein each of the second pair of high-voltage terminals is designed as a pin for coupling with a corresponding socket of the second high-voltage component.

7. The plug assembly according to claim 6, wherein at least one end of the pins is provided with an electrically insulating layer in the plug-in direction.

8. The plug assembly according to claim 1, wherein the housing is provided with a first housing component, which comprises at least in some areas electric insulation for at least one of the second pair of high-voltage terminals, and a second housing component, which comprises at least in some areas electric insulation for at least the other of the second pair of high-voltage terminals.

9. The plug assembly according to claim 8, wherein the first and the second housing components are movably mounted relative to each other and relative to a third housing component of the housing, and
   wherein at least the first pair of high-voltage terminals is arranged on the third housing component.

10. The plug assembly according to claim 9, wherein the first and the second housing components are movably mounted relative to a fourth housing component, and
    wherein the fourth housing component is designed to fix the first and the second housing components in a plug-in direction.

11. The plug assembly according to claim 10, wherein each of the second pair of high-voltage terminals are movably mounted in the plug-in direction and in a first transverse direction, and in a second transverse direction which is perpendicular to a plane that is formed by the plug-in direction and the first transverse direction.

* * * * *